(12) United States Patent
Ringwald

(10) Patent No.: US 12,066,573 B2
(45) Date of Patent: Aug. 20, 2024

(54) OPTOELECTRONIC SENSOR AND METHOD FOR DETECTING AN OBJECT

(71) Applicant: SICK AG, Waldkirch (DE)

(72) Inventor: Siegfried Ringwald, Waldkirch (DE)

(73) Assignee: SICK AG, Waldkirch (DE)

( * ) Notice: Subject to any disclaimer, the term of this patent is extended or adjusted under 35 U.S.C. 154(b) by 895 days.

(21) Appl. No.: 17/111,322

(22) Filed: Dec. 3, 2020

(65) Prior Publication Data

US 2021/0173051 A1 Jun. 10, 2021

(51) Int. Cl.
| | |
|---|---|
| *G01S 7/48* | (2006.01) |
| *G01S 7/481* | (2006.01) |
| *G01S 7/495* | (2006.01) |
| *G01S 17/10* | (2020.01) |
| *G01S 17/894* | (2020.01) |

(52) U.S. Cl.
CPC ............ *G01S 7/4817* (2013.01); *G01S 7/495* (2013.01); *G01S 17/10* (2013.01); *G01S 17/894* (2020.01)

(58) Field of Classification Search
USPC ........................................................ 356/5.01
See application file for complete search history.

(56) References Cited

U.S. PATENT DOCUMENTS

| 4,656,462 A | 4/1987 | Araki et al. |
| 5,659,642 A | 8/1997 | King et al. |
| 9,476,981 B2 * | 10/2016 | Yaacobi ................ G01S 17/931 |
| 10,132,928 B2 * | 11/2018 | Eldada ................... G01S 7/4814 |
| 10,338,321 B2 | 7/2019 | Hosseini et al. |
| 10,466,570 B2 * | 11/2019 | Hassan ................. G02F 1/2955 |
| 10,649,306 B2 * | 5/2020 | Skirlo .................... G02F 1/3136 |
| 11,061,140 B2 * | 7/2021 | Hosseini ................. G01S 17/42 |
| 2015/0293224 A1 | 10/2015 | Eldada et al. |
| 2015/0346340 A1 | 12/2015 | Yaacobi et al. |
| 2018/0267250 A1 * | 9/2018 | Hosseini ................. G01S 17/42 |
| 2018/0306925 A1 | 10/2018 | Hosseini et al. |

(Continued)

FOREIGN PATENT DOCUMENTS

| CN | 109581329 A | 4/2019 |
| DE | 4307155 A1 | 9/1994 |

(Continued)

OTHER PUBLICATIONS

European Search Report for Application 20209593.1 (EP 3,832,344 A). 5 pages. (Apr. 3, 2021) (Year: 2021).*

(Continued)

*Primary Examiner* — James R Hulka
(74) *Attorney, Agent, or Firm* — Nath, Goldberg & Meyer; Jerald L. Meyer; Tanya E. Harkins

(57) ABSTRACT

An optoelectronic sensor for detecting an object in a monitored zone having at least one light source for transmitting transmitted light, a light receiver having a reception optics arranged upstream for generating received signals from light beams remitted at the object, and a control and evaluation unit for acquiring information on the object from the received signals has a beam splitter arrangement arranged downstream of the light source for splitting the transmitted light into a plurality of transmitted light beams separated from one another, wherein the beam splitter arrangement includes a plurality of switchable beam splitters for splitting the transmitted light.

14 Claims, 5 Drawing Sheets

(56) References Cited

U.S. PATENT DOCUMENTS

2019/0064632 A1 2/2019 Hassan et al.
2019/0265574 A1 8/2019 Skirlo et al.

FOREIGN PATENT DOCUMENTS

| DE | 19821245 C1 | 3/2000 |
| DE | 10156282 A1 | 6/2003 |
| DE | 19757849 B4 | 12/2004 |
| DE | 102004014041 A1 | 10/2005 |
| DE | 102017204546 A1 | 9/2018 |
| DE | 102017213465 A1 | 2/2019 |
| DE | 102017222864 A1 | 6/2019 |
| EP | 1927867 B1 | 4/2012 |

OTHER PUBLICATIONS

J. K. Doylend, M. J. R. Heck, J. T. Bovington, J. D. Peters, M. L. Davenport, L. A. Coldren, and J. Bowers, "Hybrid silicon free-space source with integrated beam steering", Proc. SPIE 8629, Silicon Photonics Viii, vol. 862911, (Mar. 2013).

D. A. May-Arrioja , P. LiKamWa, J. J. Sanchez-Mondragon, R. J. Selvas-Aguilar, and I. Torres-Gomez, "A Reconfigurable Multimode Interference Splitter for Sensing Applications", Measurement Science and Technology, vol. 18, pp. 3241-3246.

\* cited by examiner

OPTOELECTRONIC SENSOR AND METHOD FOR DETECTING AN OBJECT

FIELD

The invention relates to an optoelectronic sensor and to a method for detecting an object in a monitored zone.

BACKGROUND

Many optoelectronic sensors work in accordance with the scanning principle in which a light beam is transmitted into the monitored zone and the light beam reflected by an object is received again in order then to electronically evaluate the received signal. The time of flight is here often measured using a known phase method or pulse method to determine the distance of a scanned object. This method is also called LIDAR (light detection and ranging).

To expand the measured zone, the scanning beam can be moved, on the one hand, as is the case in a laser scanner. A light beam generated by a laser there periodically sweeps over the monitored zone with the help of a deflection unit. In addition to the measured distance information, a conclusion is drawn on the angular location of the object from the angular position of the deflection unit and the site of an object in the monitored zone is thus detected in two-dimensional polar coordinates.

Another possibility for extending the measured zone comprises simultaneously detecting measured points using a plurality of scanning beams. This can also be combined with a laser scanner that then does not only detect a monitored plane, but also a three-dimensional spatial zone via a plurality of monitored planes.

An optoelectronic multiplane sensor for monitoring a three-dimensional spatial zone is known from EP 1 927 867 B1. The sensor has a plurality of image sensors spaced apart from one another. A light source can be associated with each image sensor and a distance can be determined via a pulse time of flight or by a phase process with its aid. The multiplane sensor is basically set up as a multiplication of individual plane sensors and is thereby relatively bulky.

The scanning movement is achieved by a rotating mirror in most laser scanners. Particularly on the use of a plurality of scanning beams, however, it is also known in the prior art to instead have the total measurement head with the light sources and light receivers rotate, as is described, for example, in DE 197 57 849 B4.

In all the described cases of multiple scanning, a light source is required that generates a plurality of light beams having sufficient power and beam quality. The known solutions in which only single-beam transmission modules are replicated are too complex, however.

A distance image sensor is known from DE 101 56 282 A1 by which a matrix of, for example, vertical semiconductor lasers is imaged on the scene to be presented via a transmission optics.

DE 10 2004 014 041 A1 discloses a sensor system for obstacle recognition in which a sensor head rotated about its axis. A laser array having a plurality of single lasers that are imaged on the environment via an optics is located in the sensor head.

A device for detecting objects is described in U.S. Pat. No. 4,656,462 that has an LED array as the light source in whose beam path a collimator lens is arranged, whereby a light fan is produced.

The devices indicated use either a plurality of light sources or one light source whose light beam scans the monitored zone by movement of the light source itself or with the aid of movable optics such as rotating mirrors to scan an expanded monitored zone. The use of a plurality of light sources as a rule means increased space requirements for the sensor. Movable optical arrangements can, for example, be susceptible toward vibrations, which can be disadvantageous on a use in a mobile deployment in vehicles.

A LIDAR scanner is disclosed in U.S. Pat. No. 10,338,321 that scans a monitored zone by a transmitted beam without any movable optical arrangements while using optical switches. The monitored zone is here, however, only scanned by one single beam; a multiple scanning is not described.

SUMMARY

It is therefore the object of the invention to simplify the setup of a multi-beam optoelectronic sensor.

This object is satisfied by an optoelectronic sensor and by a method for detecting an object in a monitored zone in accordance with the respective independent claim. The sensor in accordance with the invention is a multiple scanner that can transmit a plurality of transmitted light beams spaced apart from one another while using a switchable beam splitter arrangement having at least one light source. The transmitted light beams are not to be understood as beams in the sense of geometrical optics within a larger bundle of rays, but rather as mutually separate light beams and thus isolated scanning beams that generate correspondingly isolated, mutually spaced apart light spots in the monitored zone on impinging onto an object. An associated light receiver is able to generate a plurality of received signals from a plurality of light beams remitted from different directions, that is, for example, in that one respective photodiode is present per transmitted light beam or individual reception elements or also pixels of an image sensor are correspondingly grouped on a spatially resolved light receiver. These received signals are evaluated to acquire information on the object.

The invention starts from the basic idea of using a beam splitter arrangement for the splitting of the light transmitted by the light source into a plurality of transmitted light beams, with the beam splitter arrangement having at least one input for receiving transmitted light and a plurality of outputs for emitting transmitted light. The number of outputs is here larger than the number of inputs. The beam splitter arrangement has at least one switchable beam splitter to distribute the transmitted light over the outputs.

Switchable beam splitters are here to be understood as elements that can have one or more beam inputs and a plurality of beam outputs, with one or more of the beam outputs being able to be activated so that light entering into the beam input only exits the activated beam outputs.

Switchable waveguide couplers such as are known from the field of telecommunications engineering can preferably be used as switchable beam splitters. They are characterized by robustness and compact construction shapes. A switchable waveguide coupler substantially has two adjacent light guide fibers between which an electric field can be built up by applying a voltage. If light is coupled at the input of the first fiber and if a voltage is applied, the light is transmitted via an evanescent field toward the second fiber and can be decoupled at its end. If no voltage is applied, the light remains in the first fiber and can again be decoupled at its end. Switchable waveguide couplers are typically used as optical switches, with light coupled in being either switched to the one first output or to a second output. Switchable waveguide couplers can be designed as integrated optics. This has the advantage that moving optical components such as rotating mirrors can be dispensed with and a robust system can thus be implemented.

The light of a light source can be split into almost any desired number of transmitted light beams by cascading a plurality of switchable beam splitters in a beam splitter arrangement so that one or more outputs of the beam splitter arrangement transmit transmitted light beams depending on the control. The number of activated outputs simultaneously transmitting transmitted light beams is here substantially given by the required transmitted light power in the individual transmitted light beams, by the available light power of the light source, and by the coupling losses between the beam splitters.

The degree of coupling in the waveguide coupler can depend on the following parameters: distance of the fibers from one another; length of the coupling regions disposed in parallel with one another; wavelength of the transmitted light; material between the fibers; material of the fibers; applied voltage. On a use of switchable waveguide couplers, there is therefore the possibility of simultaneously activating both outputs on application of a suitable voltage to simultaneously illuminate the monitored zone with a plurality of transmitted light beams. This has the advantage that a sequential scanning of a monitored zone with a plurality of transmitted light beams can take place and thus an increased scanning rate can be achieved.

Typical switching times of switchable waveguide couplers are in the range from 0.5 to 5 Mhz. A fast scanning of the monitored zone is thus possible.

In an embodiment of the invention, the optoelectronic sensor has a light source for transmitting transmitted light. The transmitted light is coupled into a beam splitter arrangement arranged downstream of the light source. The beam splitter arrangement has at least one input for coupling transmitted light and a plurality of outputs for decoupling transmitted light, with the number of outputs being greater than the number of inputs. The beam splitter arrangement furthermore has a plurality of switchable beam splitters for splitting the transmitted light over the outputs. The switchable beam splitters can be controlled such that the transmitted light can be simultaneously distributed over at least two outputs of the beam splitter arrangement. Outputs from which transmitted light exits are also called activated outputs. The optoelectronic sensor can furthermore have a transmission optics for projecting the transmitted light beams into a monitored zone and a light receiver having a reception optics arranged upstream for receiving light beams remitted from the monitored zone. Received signals generated by the light receiver can be communicated to a control and evaluation unit. To acquire information on an object in the monitored zone, the control and evaluation unit can calculate a time of flight between transmission of the transmitted light beams and reception of the light beams remitted by the object from the received signals and can thereby determine a distance of the object from the sensor.

A plurality of switchable beam splitters can be arranged cascading in a plurality of planes to generate a plurality of outputs of the beam splitter arrangement, with the respective two outputs of a switchable beam splitter being able to be connected to the inputs of following switchable beam splitters. On the use of beam splitters that split an input beam over two output beams, $2^n$ outputs are thus obtained with n planes. The connection of the switchable beam splitters can take place via optical fibers, waveguides, or in a free beam.

In an embodiment, the outputs of the beam splitter arrangement can be arranged one-dimensionally in a line. High resolution line scanners typically have a field of view (FOV) of 60 degrees at an angular resolution of 0.25 degrees, which can be advantageously implemented by a beam splitter arrangement with 240 linearly arranged outputs, that is four outputs per degree of field of view. In simpler arrangements, angular resolutions of one to two degrees are frequently sufficient so that the number of outputs of the beam splitter arrangement can be correspondingly reduced. An output of the beam splitter arrangement can therefore scan a typical field of view of at most two degrees, preferably of at most one degree, particularly preferably of at most 0.25 degrees.

In a further embodiment, the outputs of the beam splitter arrangement can be arranged two-dimensionally in a matrix. A two-dimensional monitored zone can thus be scanned. The considerations on the advantageous number of outputs of the beam splitter arrangement apply analogously to the above-described one-dimensional case.

The control and evaluation unit can be adapted to control each switchable beam splitter individually, in particular to set an individual splitting ratio for each switchable beam splitter, that is how many percent of the light power coupled into the switchable beam splitter exits the respective output of the switchable beam splitter. The transmitted light power of the transmitted light beams can thus be varied for every output of the beam splitter arrangement. The marginal regions of a monitored zone can thus be scanned, for example, at a higher transmitted light power than the middle zones.

The control of the switchable beam splitters in the beam splitter arrangement can also take place in dependence on evaluation results of the control and evaluation unit. If the control and evaluation unit, for example, detects an object in the monitored zone, the splitting ratios of the switchable beam splitters can be set such that the transmitted light power in the object zone is increased to enable a more exact position determination.

The outputs of the beam splitter arrangement can be sequentially activated and deactivated. The monitored zone can then be scanned in a linear or grid manner as with an optical scanner.

The switchable beam splitters can also be controlled such that the monitored zone is first scanned with a low resolution, for example in that only every second output of the beam splitter arrangement is activated and transmits transmitted light beams. On a detection of an object by the control and evaluation unit, the resolution in the object zone can then be increased as required.

A transmission optics can be arranged downstream of the beam splitter arrangement, with a separate transmission optics being used for each output or a common transmission optics for groups of or for all of the outputs of the beam splitter arrangement.

With a one-dimensional linear arrangement of the outputs of the beam splitter arrangement, a diffractive optical element can additionally be arranged downstream of the outputs that again splits a respective one output beam into a defined number of transmitted light beams. A two-dimensional scan field can be scanned with such an arrangement using a one-dimensional arrangement of beam splitter outputs, with a respective line of transmitted light beams being able to be simultaneously activated.

A spatially resolving area detector, preferably a matrix of photodiodes or APDs (avalanche photodiodes) or also an image sensor having correspondingly associated individual pixels or pixel groups, can be provided for the detection of the light beams remitted by objects from the monitored zone. A further conceivable embodiment provides a SPAD (single-photon avalanche diode) receiver having a plurality of SPADs.

The control and evaluation unit can be connected to the light source, to the beam splitter arrangement, and to the detector and is preferably configured to measure the time of flight between the transmission of the light beams and the reception of the remitted light beams and thus to determine a distance of an object in the monitored zone using a known phase or pulse method. The sensor thereby becomes distance measuring. Alternatively, only the presence of an object can be determined and output as a switching signal, for example.

The detector can be synchronized with the scanning of the monitored zone to suppress interfering or extraneous light. For example, only the receiver groups or pixel groups of the detector can thus be activated that receive remitted light from the zones of the monitored zone scanned by the activated beam splitter outputs.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
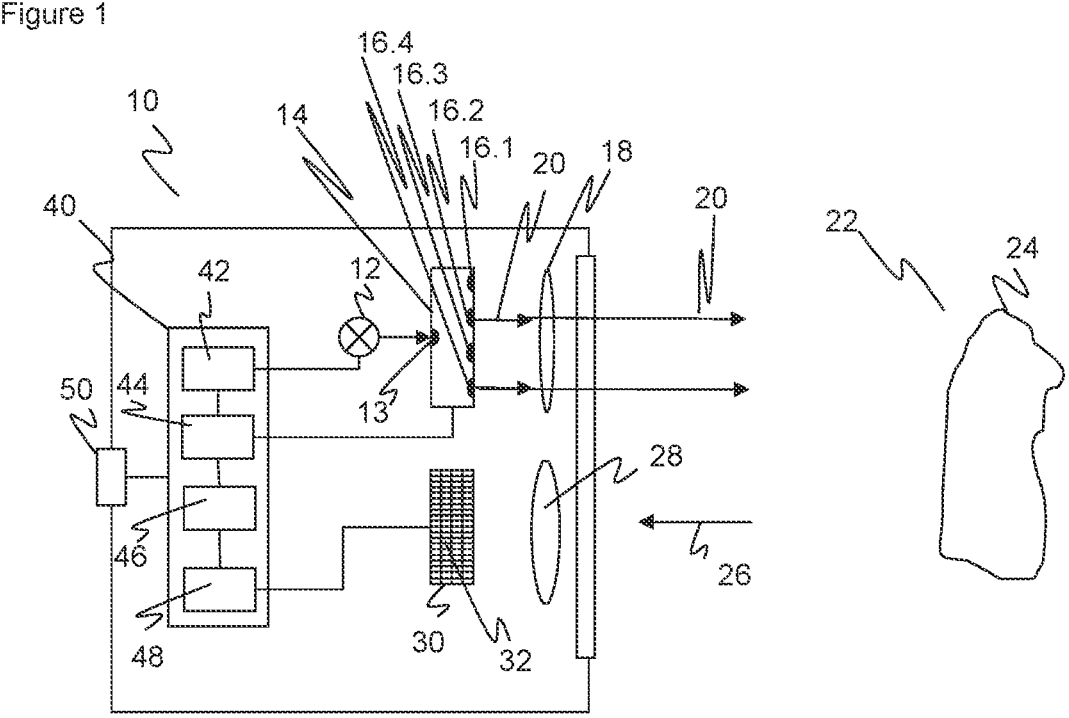
FIG. 1 a schematic representation of an optoelectronic sensor.

FIG. 1 shows a schematic representation of an optoelectronic sensor 10 in an embodiment as a multi-beam distance scanner. The sensor 10 has a light source 12, for example a laser diode, whose transmitted light is coupled into an input 13 of a beam splitter arrangement 14 having a plurality of outputs 16.1, 16.2, 16.3, 16.4. The beam splitter arrangement 14 can have a plurality of switchable beam splitters (not shown) that can split the transmitted light over one or more of the outputs 16.1, 16.2, 16.3, 16.4. The transmitted light exiting the outputs 16.1, 16.2, 16.3, 16.4 can be collimated with a transmission optics 18 and can be projected as a transmitted light beam 20 into a monitored zone 22. The light remitted at an object 24 in the monitored zone 22 is conducted as received light 26 to a light receiver 30 via a reception optics 28.

The light receiver 30 is configured as a matrix of a plurality of light reception elements 32, preferably as a matrix of photodiodes APDs (avalanche photodiodes) or SPAD (single photon avalanche diode) receivers or also as an image sensor having correspondingly associated single pixels or pixel groups.

A control and evaluation unit 40 that is connected to the light source 12 and to the light receiver 30 is furthermore provided in the sensor 10. The control and evaluation unit 40 comprises a light source control 42, a beam splitter control 44, a time of flight measuring unit 46, and an object distance estimation unit 48, with them initially only being functional blocks that can also be implemented in the same hardware or in other functional units as in the light source 12, in the beam splitter arrangement 14, or in the light receiver 30. The control and evaluation unit 40 can output measured data via an interface 50 or can conversely accept control and parameterization instructions. The control and evaluation unit 40 can also be arranged in the form of local evaluation structures on a chip of the light receiver 30 or can interact as a partial implementation with the functions of a central evaluation unit (not shown).

The function of the beam splitter arrangement 14 of FIG. 1 should now be explained with reference to an exemplary beam splitter arrangement having one input and eight outputs.

Figure 2:
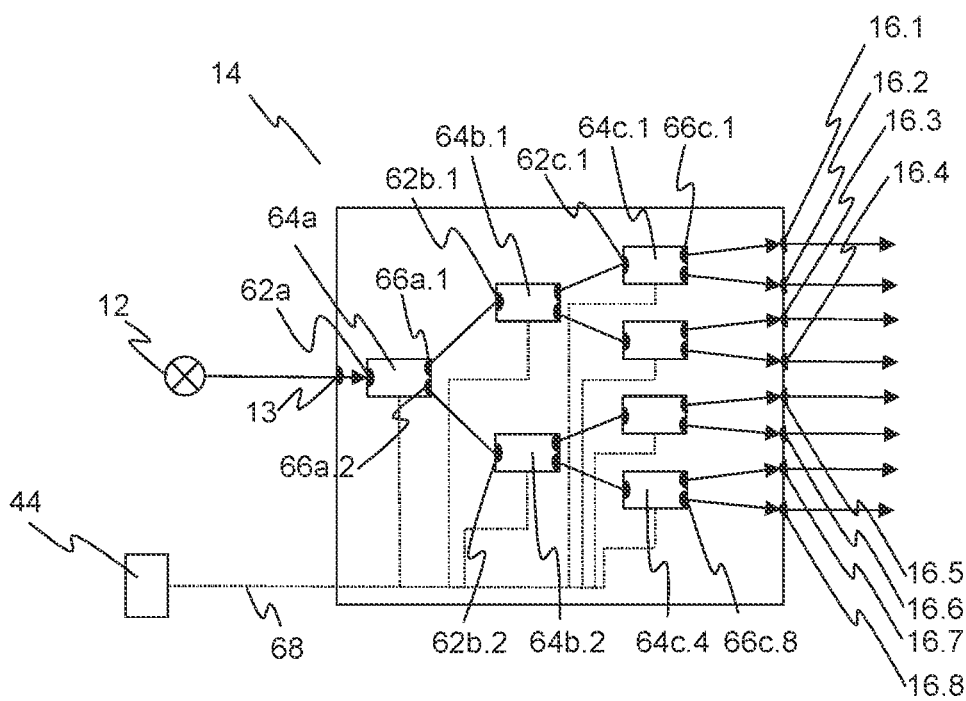
FIG. 2 a schematic representation of a beam splitter arrangement.

FIG. 2 shows a beam splitter arrangement 14 having seven switchable beam splitters 64a, 64b.1, 64b.2, 64c.1, 64c.2, 64c.3, 64c.4 that are arranged cascaded in three planes.

The first plane has a switchable beam splitter 64a having one input 62a and two outputs 66a.1, 66a.2. The second plane has two switchable beam splitters 64b.1, 64b.2, each having one input 62b.1, 62b.2 and two outputs 66b.1, 66b.2, 66b.3, 66b.4. The third plane has four switchable beam splitters 64c.1, 64c.2, 64c.3, 64c.4, each having one input 62c.1, 62c.2, 62c.3, 62c.4 and two outputs 66c.1, 66c.2, 66c.3, 66c.4, 66c.5, 66c.6, 66c.7, 66c.8.

Transmitted light from the light source 12 can be coupled into the beam input 62a of the first switchable beam splitter 64a via the input 13 of the beam splitter arrangement 14. The beam splitter 64a has two outputs 66a.1, 66a.2 from which the transmitted light can be coupled into the input 62b.1 of the beam splitter 64b.1 and/or into the input 62b.2 of the beam splitter 64b.2 of the second plane. The transmitted light from the beam splitter 64b.1 can be coupled via the output 66b.1 into the input 62c.1 of the beam splitter 64c.1 and/or via the output 66b.3 into the input 62c.2 of the beam splitter 64c.2 of the third plane.

The transmitted light from the beam splitter 64b.2 can be coupled via the output 66b.3 into the input 62c.3 of the beam splitter 64c.3 and/or via the output 66b.4 into the input 62c.4 of the beam splitter 64c.4 of the third plane.

The transmitted light from the outputs 66c.1, 66c.2, 66c.3, 66c.4, 66c.5, 66c.6, 66c.7, 66c.8 of the switchable beam splitters 64c.1, 64c.2, 64c.3, 64c.4 of the third plane can be decoupled from the beam splitter arrangement 14 via the outputs 16.1, 16.2, 16.3, 16.4, 16.5, 16.6, 16.7, 16.8.

The outputs 16.1, 16.2, 16.3, 16.4, 16.5, 16.6, 16.7, 16.8 of the beam splitter arrangement 14 can be designed as grid couplers. The construction size of a grid coupler output amounts to between 10 µm and 25 µm depending on the type. The grid couplers can be positioned next to one another at very small intervals of typically 5 µm. A length of 3.6 mm (grid coupler output with a construction size of 10 μm and an interval of 5 μm to the next output) up to 7.2 mm (grid coupler output with a construction size of 25 μm and an interval of 10 μm to the next output) thus results for a beam splitter arrangement 14 having a one-dimensional linear arrangement of 240 outputs.

The switchable beam splitters 62a, 62b.1, 62b.2, 62c.1, 62c.2, 62c.3, 62c.4 are connected to the beam splitter control 44 via a wired or wireless (radio for example) connection 68. The splitting ratio for individual ones or groups of switchable beam splitters can be set using the beam splitter control 44. The splitting ratio can preferably be set individually for every switchable beam splitter.

Figure 3A:
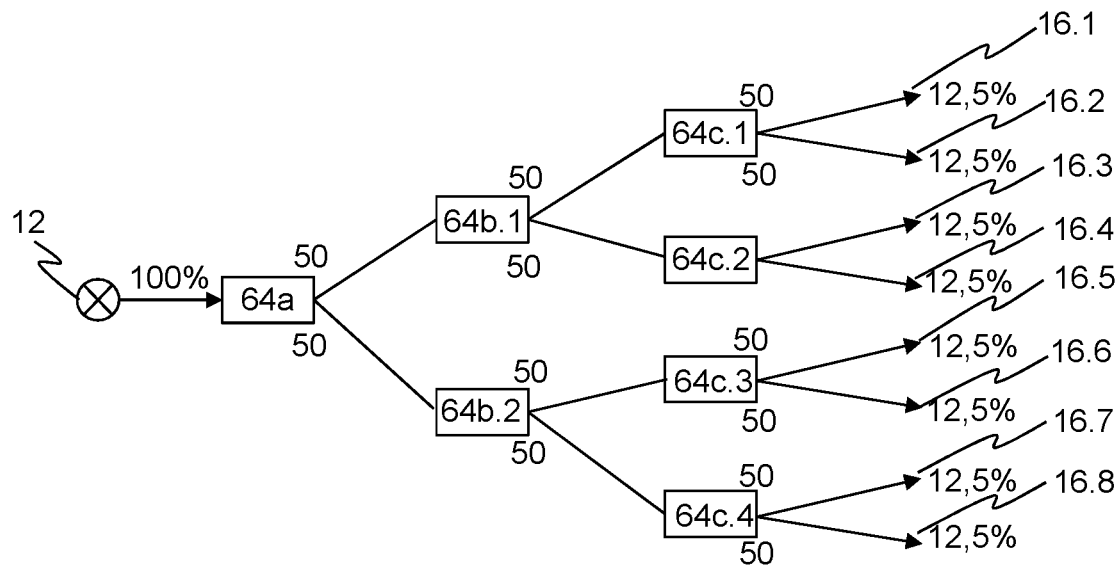
FIG. 3a a control example for a beam splitter arrangement with a uniform distribution of the transmitted light power over all outputs.

FIG. 3a shows an exemplary setting of the switchable beam splitters 62a, 62b.1, 62b.2, 62c.1, 62c.2, 62c.3, 62c.4, with a splitting ratio of the beam splitter outputs of 50/50 being set for all the beam splitters. At 100% input power of the transmitted light from the light source 12, a power of 12.5% of the input power is thus applied at every output, with coupling losses being left out of consideration in this representation and in the following representations. A monitored zone could therefore be simultaneously scanned over a large area at this setting.

Figure 3B:
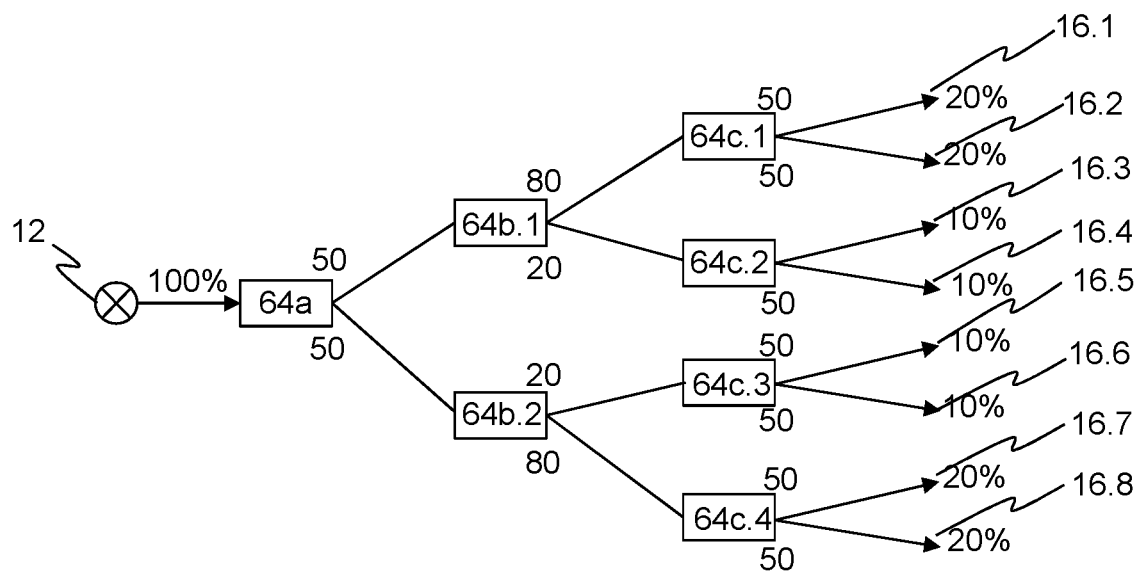
FIG. 3b a control example for a beam splitter arrangement with a variable distribution of the transmitted light power.

FIG. 3b shows a further exemplary setting, with a splitting ratio of the beam splitter outputs of 50/50 being set for the beam splitters of the first plane 64a and of the third plane 62c.1, 62c.2, 62c.3, 62c.4, a splitting ratio of the beam splitter outputs of 80/20 being set for the first beam splitter of the second plane 62b.1, and a splitting ratio of the beam splitter outputs of 20/80 being set for the second beam splitter of the second plane 62b.2. The outer outputs 16.1, 16.2, 16.7, 16.8 of the beam splitter arrangement 14 are thereby acted on by a power of 20% of the input power than the inner outputs 16.3, 16.4, 16.5, 16.6 that are acted on by a power of 10% of the input power. The marginal zone of a monitored zone could thus be scanned at a higher power than the center.

The switchable beam splitters can also be controlled dynamically so that a scanning of the monitored zone by transmitted light beams of higher power is possible. Individual switchable beam splitters can be operated for this purpose at a splitting ratio of 100/0 as is described by way of example in FIGS. 4a and 4b.

Figure 4A:
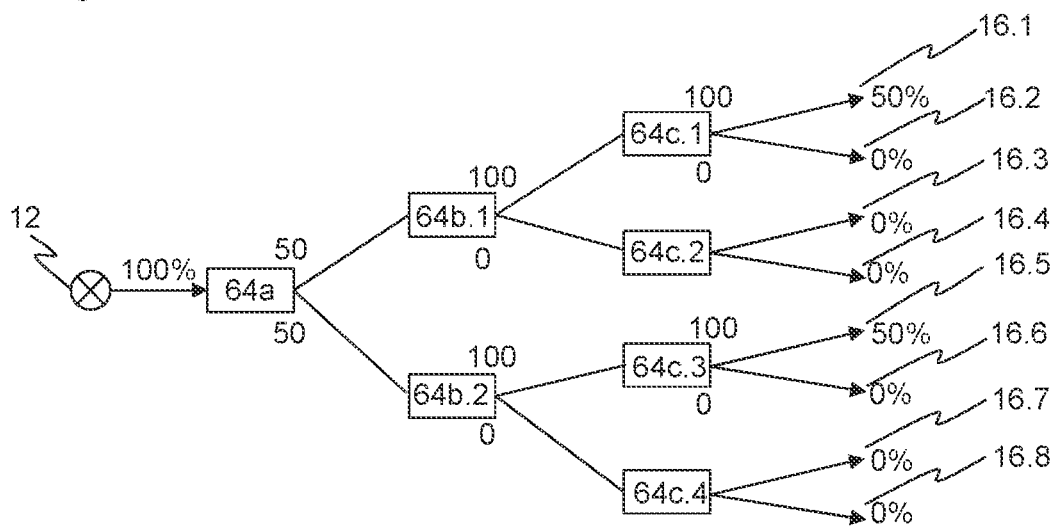
FIGS. 4a-4c a control example for a beam splitter arrangement for scanning a monitored zone.

FIG. 4a shows the setting of the switchable beam splitters at the start of a scan procedure in which the monitored zone is scanned with 2 transmitted light beams. For this purpose, the switchable beam splitter first splits the transmitted light at a splitting ratio of 50/50. The switchable beam splitters of the second plane 64b.1, 64b.2 and the switchable beam splitters 64c.1 and 64c.3 of the third plane are operated at a splitting ratio of 100/0 so that only the outputs 16.1 and 16.5 of the beam splitter arrangement are acted on by 50% of the input power in each case. A control of the switchable beam splitters 64c.2 and 64c.4 of the third plane is not necessary since they are not acted on by transmitted light.

Figure 4B:
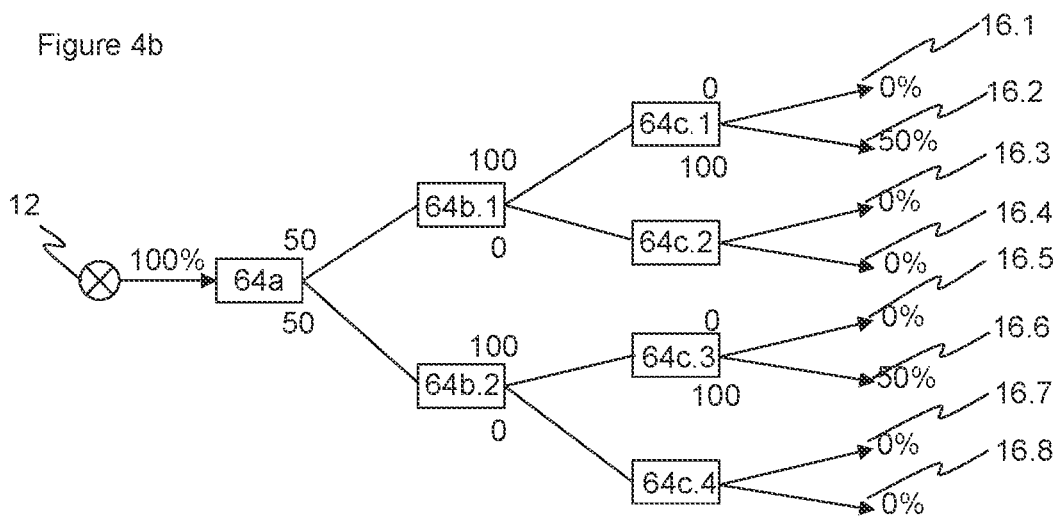

In the next step shown in FIG. 4b, the splitting ratio of the switchable beam splitters 64c.1 and 64c.3 of the third plane is switched to 0/100 so that only the outputs 16.2 and 16.6 of the beam splitter arrangement are acted on by 50% of the input power in each case.

Figure 4C:
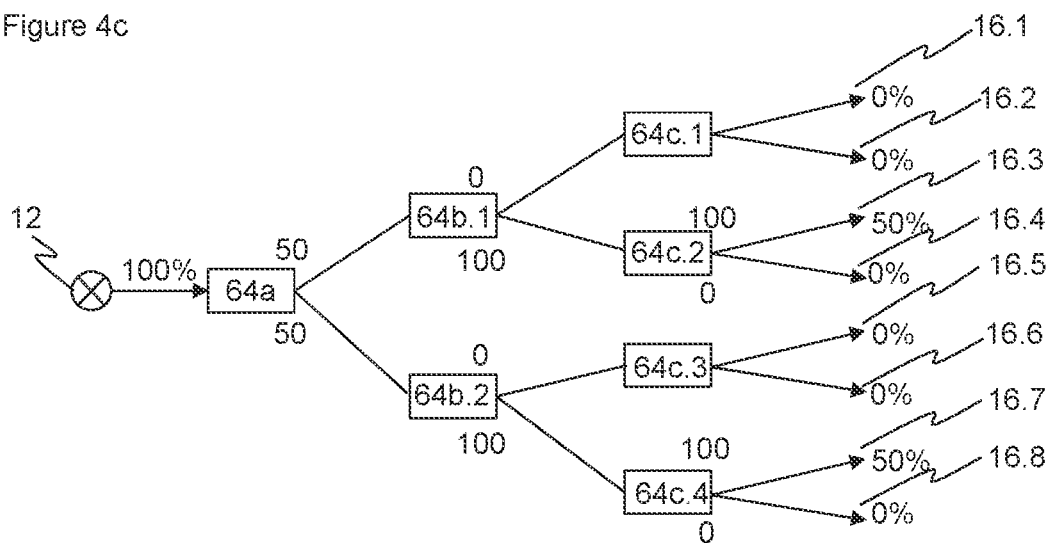

The next step of the scan procedure is shown in FIG. 4c in which the splitting ratio of the switchable beam splitters of the second plane 64b.1, 64b.2 is switched to 0/100 so that now the beam splitters 64c.2 and 64c.4 of the third plane are acted on by transmitted light, with a respective splitting ratio of 100/0 being set for the beam splitters 64c.2 and 64c.4 so that only the outputs 16.3 and 16.7 of the beam splitter arrangement are acted on by 50% of the input power in each case.

In the following step (not shown), the splitting ratio of the switchable beam splitters 64c.2 and 64c.4 of the third plane is then switched to 0/100 so that only the outputs 16.4 and 16.8 of the beam splitter arrangement are acted on by 50% of the input power in each case. The monitored zone was thus scanned by two transmitted light beams and the scan procedure can start again using the configuration shown in FIG. 4a.

Figure 5A:
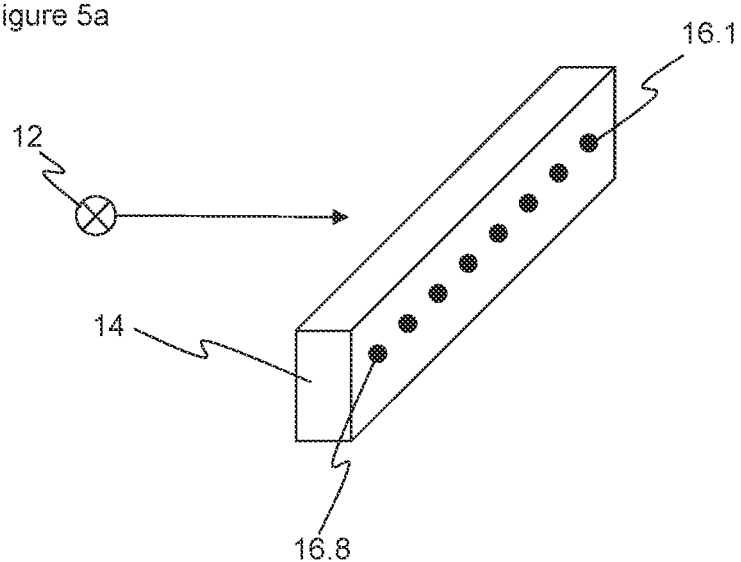
FIG. 5a an example for a beam splitter arrangement with linearly arranged outputs.
Figure 5B:
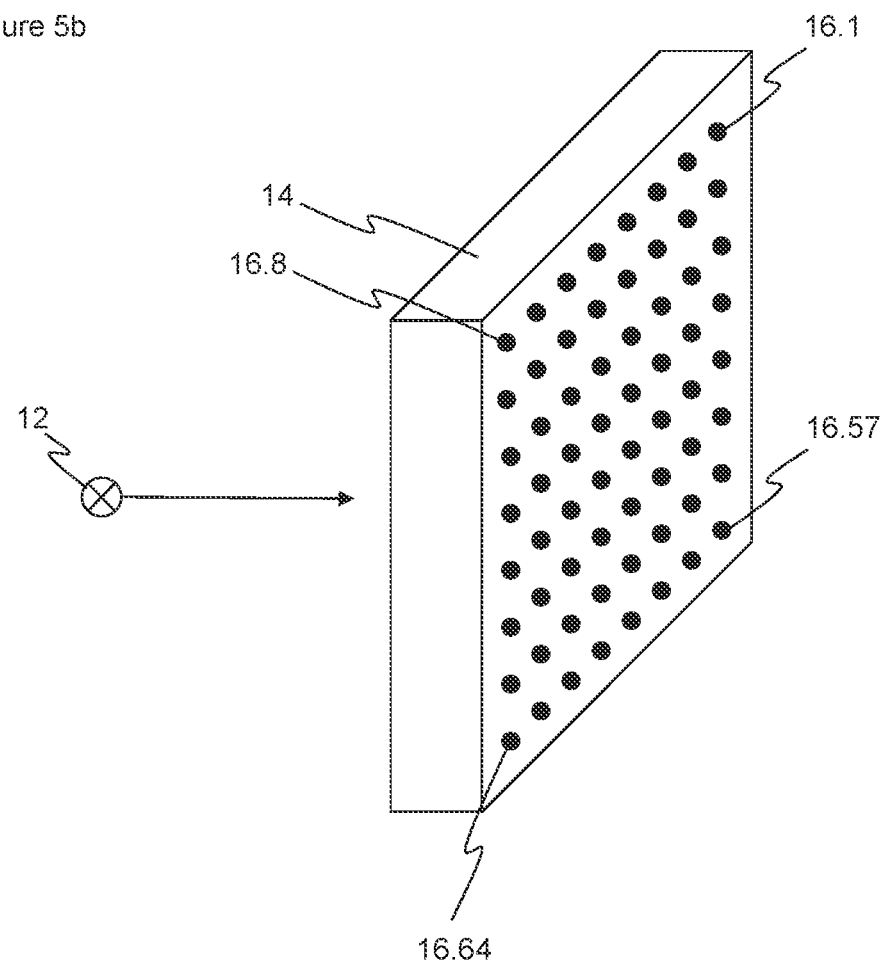
FIG. 5b an example for a beam splitter arrangement with outputs arranged in a two-dimensional matrix.

FIGS. 5a and 5b show possible geometrical arrangements of the outputs 16 of a beam splitter arrangement 14. The outputs can be arranged linearly (one-dimensional arrangement), for example, as shown in FIG. 5a or in the form of a two-dimensional matrix, for example as a quadratic matrix in FIG. 5, with 64 times 64 outputs 16.1 to 16.64. Other arrangement possibilities such as a circular arrangement of the outputs are likewise possible.

Figure 6:
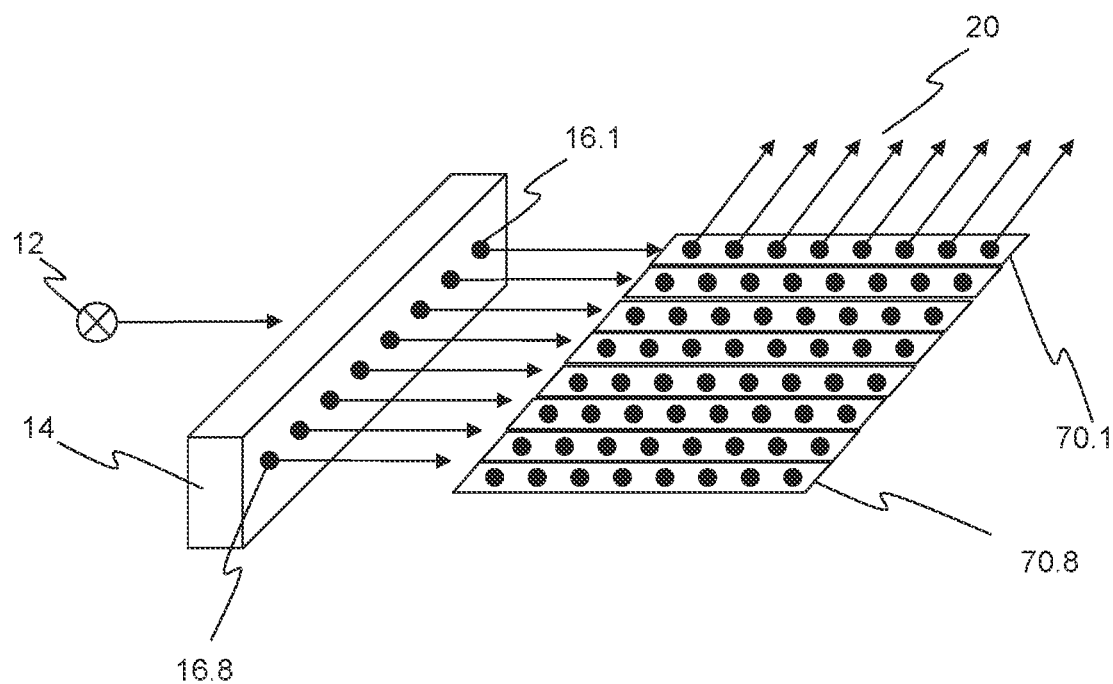
FIG. 6 a beam splitter arrangement with a diffractive optical element for further beam splitting arranged downstream.

FIG. 6 shows a beam splitter arrangement 14 having a one-dimensional linear arrangement of outputs 16.1, 16.8, with a static beam splitter 70.1, 70.8 being arranged downstream of each output that splits the transmitted light exiting the outputs 16.1, 16.8 of the beam splitter arrangement 14 into eight respective transmitted light beams 20. The splitting into 8 transmitted light beams is also only to be understood as purely exemplary here. The static beam splitters 70.1, 70.8 can be designed as a diffractive optical element; they can have grid couplers (not shown) to decouple the transmitted light from the static beam splitter 70.1, 70.8. The beam splitter arrangement 14, the static beam splitters 70.1, 70.8, and the grid couplers can be designed as an integrated optics. The construction size of a grid coupler output amounts to between 10 μm and 25 μm depending on the type. The grid coupler outputs can be positioned next to one another at very small intervals of typically 5 μm. A length of 3.6 mm (grid coupler output with a construction size of 10 μm and an interval of 5 μm to the next output) up to 7.2 mm (grid coupler output with a construction size of 25 μm and an interval of 10 μm to the next output) thus results for a beam splitter arrangement 14 having a one-dimensional linear arrangement of 240 outputs.

The invention claimed is:

1. An optoelectronic sensor for detecting an object in a monitored zone, the optoelectronic sensor comprising:
   at least one light source for transmitting transmitted light;
   a beam splitter arrangement arranged downstream of the light source for splitting the transmitted light into a plurality of transmitted light beams separated from one another;
   transmission optics for projecting the transmitted light beams into the monitored zone to produce separate, spaced light spots when they hit an object in the monitored zone;
   a light receiver having a reception optics arranged upstream for generating received signals from light beams remitted at the object; and
   a control and evaluation unit for acquiring information on the object from the received signals that is configured to determine a distance of the object from a time of flight between the transmission of the transmitted light beams and the reception of the remitted light beams,
   wherein the beam splitter arrangement has at least one input for receiving the transmitted light from the light source, a plurality of outputs for transmitting the transmitted light beams, a plurality of switchable beam splitters for splitting the transmitted light over the outputs, and a beam splitter control for controlling the switchable beam splitters, and wherein the switchable beam splitters are configured for a simultaneous splitting of the transmitted light over at least two outputs of the beam splitter arrangement.

2. The optoelectronic sensor in accordance with claim 1, wherein the outputs of the beam splitter arrangement are arranged linearly.

3. The optoelectronic sensor in accordance with claim 2, wherein at least one diffractive element for splitting the transmitted light is arranged downstream of the outputs of the beam splitter arrangement.

4. The optoelectronic sensor in accordance with claim 1, wherein the outputs of the beam splitter arrangement are arranged in a two-dimensional matrix.

5. The optoelectronic sensor in accordance with claim 1, wherein the outputs of the beam splitter arrangement each have a field of view of at most two degrees.

6. The optoelectronic sensor in accordance with claim 5, wherein the outputs of the beam splitter arrangement each have a field of view of at most one degree.

7. The optoelectronic sensor in accordance with claim 5, wherein the outputs of the beam splitter arrangement each have a field of view of at most 0.25 degrees.

8. The optoelectronic sensor in accordance with claim 1, wherein the switchable beam splitters are designed as integrated switchable waveguide couplers.

9. The optoelectronic sensor in accordance with claim 8, wherein the control of the switchable beam splitters includes the setting of splitting ratios of the switchable beam splitters.

10. The optoelectronic sensor in accordance with claim 1, wherein the beam splitter control individually controls the switchable beam splitters.

11. The optoelectronic sensor in accordance with claim 1, wherein the beam splitter control controls the switchable beam splitters in dependence on a signal of the control and evaluation unit.

12. The optoelectronic sensor in accordance with claim 1, wherein the beam splitter arrangement is configured as an integrated optics.

13. The optoelectronic sensor in accordance with claim 12, wherein the beam splitter arrangement has a grid coupler for decoupling the transmitted light.

14. A method of detecting an object in a monitored zone comprising the steps:
transmitting transmitted light using a light source;
receiving the transmitted light in a beam splitter arrangement;
controlling switchable beam splitters of the beam splitter arrangement using a beam splitter control;
generating transmitted light beams by splitting the transmitted light over at least two outputs of the beam splitter arrangement;
projecting the transmitted light beams into the monitored zone to produce separate, spaced light spots when they hit an object in the monitored zone;
receiving light beams remitted at the object;
measuring a time of flight between the transmission of the transmitted light beams and the reception of the remitted light beams; and
determining a distance of the object from the time of flight.

* * * * *

UNITED STATES PATENT AND TRADEMARK OFFICE
CERTIFICATE OF CORRECTION

PATENT NO. : 12,066,573 B2
APPLICATION NO. : 17/111322
DATED : August 20, 2024
INVENTOR(S) : Siegfried Ringwald Page 1 of 1

It is certified that error appears in the above-identified patent and that said Letters Patent is hereby corrected as shown below:

On the Title Page

Insert item (30), --December 5, 2019 (DE) .............. 10 2019 133 096.3--.

Signed and Sealed this
Fifth Day of November, 2024

Katherine Kelly Vidal
*Director of the United States Patent and Trademark Office*